United States Patent [19]

Mariani

[11] Patent Number: 5,056,951
[45] Date of Patent: Oct. 15, 1991

[54] DEVICE FOR THE ROTATABLE AND ADJUSTABLE CONNECTION OF AN ARM TO A FASTENING PLATE

[75] Inventor: Roberto Mariani, Cesano Maderno, Italy

[73] Assignee: Ditta Mariani Enrico, Milan, Italy

[21] Appl. No.: 486,208

[22] Filed: Feb. 28, 1990

[51] Int. Cl.⁵ .............................................. F16C 11/06
[52] U.S. Cl. ...................................... 403/90; 403/114; 403/131
[58] Field of Search .................. 403/90, 114, 115, 131

[56] References Cited

U.S. PATENT DOCUMENTS

| | | | |
|---|---|---|---|
| 771,457 | 10/1904 | Bullard | 403/131 X |
| 2,503,373 | 4/1950 | Browning et al. | 403/90 X |
| 3,196,463 | 7/1965 | Farneth | 403/114 X |
| 3,441,299 | 4/1969 | Pfaar | 403/131 |
| 4,243,192 | 1/1981 | Johnson | 403/131 X |
| 4,917,446 | 4/1990 | Mariani | 49/246 X |

FOREIGN PATENT DOCUMENTS

| | | |
|---|---|---|
| 489389 | 1/1930 | Fed. Rep. of Germany ...... 403/114 |
| 704740 | 10/1930 | France . |
| 2398214 | 7/1977 | France . |

Primary Examiner—Andrew V. Kundrat
Attorney, Agent, or Firm—Griffin Branigan & Butler

[57] ABSTRACT

A device for connecting an arm (2) to a fastening plate (3) comprises an external casing (11) rotatably coupled to the fastening plate (3) by a pivot assembly (5). The external casing (11) is provided with a substantially cylindrical cavity having a hemispherical bottom accessible from the outside of the casing (11). The pivot (5) extends with clearance through a cylindrical cavity of a substantially spherical internal casing (21). The internal casing (21) is fastened to an extremity of the arm (2). The arm (2) extends with clearance through a clamping collar (13). The clamping collar (13) is slidably mounted in the cavity of the external casing (11) for exerting pressure against the internal casing (21) and for clamping the arm (2) in a desired variable angular position with respect to a central axis of the cavity of the external casing (11).

10 Claims, 2 Drawing Sheets

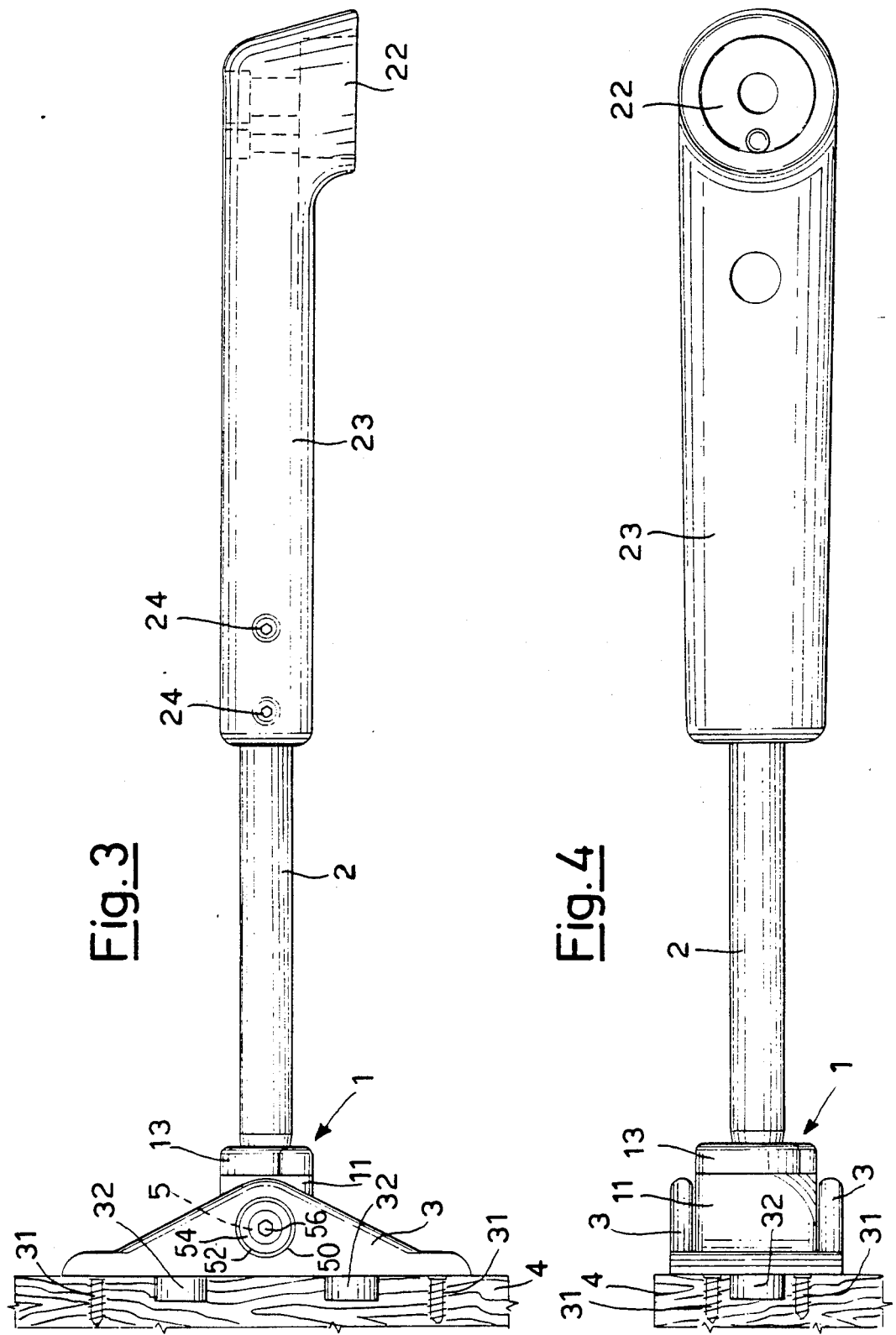

DEVICE FOR THE ROTATABLE AND ADJUSTABLE CONNECTION OF AN ARM TO A FASTENING PLATE

BACKGROUND

I. Field of the Invention

The present invention refers to an improvement of the arm, for moving the door of a cabinet from a closed to an open position and vice versa, which has been described and claimed in Italian Pat. No. 1,216,642 (corresponding to U.S. Pat. No. 4,917,446) and Italian Pat. No. 1,218,233 No. 20428 A/88 dated May 3, 1988.

II. Prior Art and Other Considerations

Italian Pat. No. 1,216,642 and U.S. Pat. No. 4,917,446 in the name of the same applicant, refers to a system for moving the door of a cabinet from a closed to an open position and vice versa. A characteristic element of said system is constituted by a pair of horizontal articulated arms wherein a first extremity of each of the two arms is rotatably mounted on an upper and a lower portion, respectively, of the fixed frame of said cabinet while the second extremity of each arm is rotatably mounted on the door in an upper and a lower point, respectively, arranged along the vertical line which passes through the center of gravity of said door.

It has, however, been noted that, in the case of fairly heavy doors, the above arms are subjected to a certain torsion and bending which lowers and, at the same time, tends to incline the door. Said lowering may be compensated by making use of the adjustable arm described in the above mentioned Italian Pat. No. 1,218,233 according to which the two parts of the articulated arms are coupled together in a rotatable and adjustable manner on the axis of the part of the arm going from the articulation up to the point where it is attached to the frame of the cabinet. The door may thus be raised by the required height by suitably rotating upwards the part of the arm going from the articulated to the door. This adjustment in height does not, however, compensate the above mentioned inclination of the door in relation to the frame which in any case jeopardizes the perfect closing of the door. Moreover, the necessity of finely adjusting the position of the door with respect to the frame is also essential to compensate any small deformations of the frame of the cabinet.

The need is therefore still keenly felt for a device which allows the fine adjustment in any direction, vertical, longitudinal or oblique, of the door of a cabinet connected to arms of the type described in the applicant's above patent applications.

SUMMARY

The aim of this invention is to accomplish the above object with a device which comprises an external casing rotatably coupled to a fastening plate by means of an assembly pivot and provided with a substantially cylindrical cavity having a hemispherical bottom accessible from the outside of said casing, a substantially spherical internal casing fastened to an extremity of an arm and housed in said cavity of said external casing and also passed through with clearance by said pivot so as to be inclinable with respect to said external casing, and a clamping collar passed through with clearance by said arm, said collar being moreover mounted slidably in said cavity of said external casing to act with pressure on said internal casing and to clamp said arm in a desired variable angular position with respect to the central axis of said cavity of said external casing.

Preferably, the maximum inclination of said arm with respect to the central axis of said cavity of said external casing is of 10°, even more preferably it is of 7°.

BRIEF DESCRIPTION OF THE DRAWINGS

These and other characteristics shall appear evident to a person skilled in the art from an embodiment of the device according to the present invention illustrated as a nonlimiting example in the enclosed tables wherein:

FIG. 3 is a plan view from above of a part of an articulated arm connected in a rotatable and adjustable manner to a fastening plate by means of a device according to the present invention;

FIG. 4 is a side view of the part of the arm illustrated in FIG. 3.

DETAILED DESCRIPTION OF THE DRAWINGS

Figure 1:
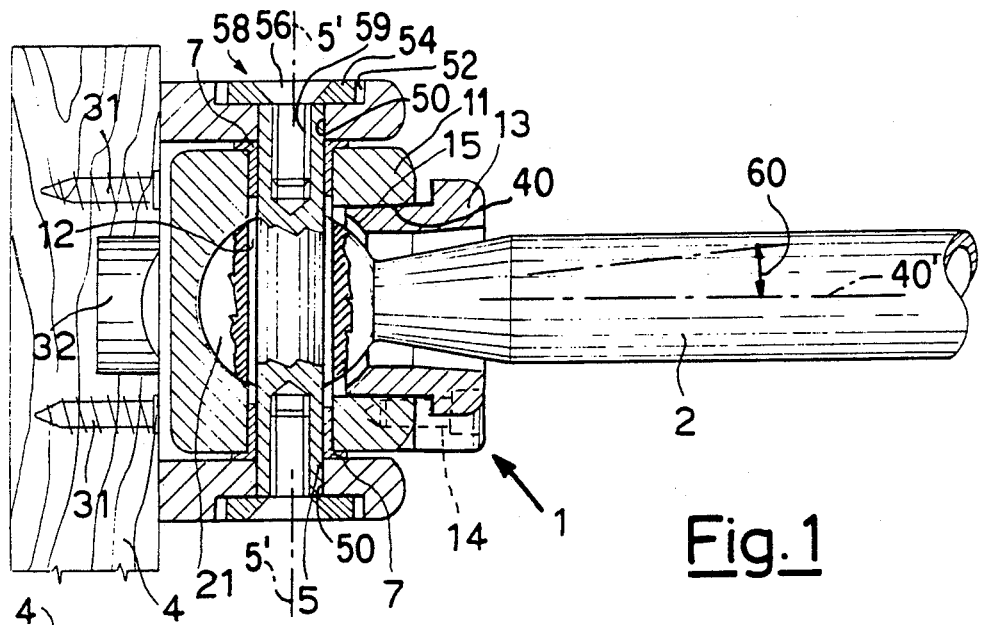
FIG. 1 is a longitudinal cross-section of the device according to the present invention.

A part of an arm illustrated in FIGS. 3 and 4 is substantially constituted by a first element (23) and a second element (2). The first element (23) has at one extremity thereof a seat (22) in the shape of a trucated cone for receiving a second (unillustrated) part of the arm, as described in Italian Pat. No. 1,218,233. The second element (2) is shaped as a substantially cylindrical bar which is slidably mounted in the other extremity of the first element (23). Suitable clamping means (24) allow said second element (2) to be made integral with said first element (23) when the penetration of the first into the second has reached the desired depth.

Thus, the length of the part of the arm illustrated in FIGS. 3 and 4 can be varied at will.

Although the second element (2) constitutes only a part of the arm, during the course of the present description and of the claims it has been designated with the term "arm" because for the objects of the present invention it is equivalent to the arm in its entirety.

As illustrated in FIGS. 1-4, a fastening plate (3) is made integral with a door (4) of a cabinet (not illustrated) by means of suitable fastening and positioning means constituted by screws (31) and by protuberances in the shape of hollow cylindrical casings (32), respectively.

The fastening plate (3) is connected to arm (2) by a device (1) according to the present invention which is constituted by an external connector member or external casing (11) internal connector member or an internal casing (21) and a clamping collar (13).

The external casing (11) is rotatably coupled to said plate by means of a pivot member (5). The external casing (11) has a substantially cylindrical cavity extending therethrough along a cylindrical axis (5'). The external casing (11) also has a hemispherical cavity formed at least partially internally therein. The hemispherical cavity communicates with the cylindrical cavity along the cylindrical axis (5'). In addition, the hemispherical cavity is accessible from the exterior of the external casing (11) through an access port (40). The port (40) has an axis (40') which is essentially orthogonal to the cylindrical axis (5').

The slidability of the external casing (11) on said pivot (5) is ensured by suitable means which, in the embodiment illustrated in the enclosed figures, are constituted by dry bearings (7).

The internal casing (21) is fastened to an extremity of the arm (2), it has a substantially spherical shape and is housed in (e.g., insertable into) said hemispherical cavity of the external casing (11). The extremity of the arm (2) which is fastened to the internal casing (21) has a tapered diameter which narrows as it approaches the internal casing (21). Moreover, the internal casing (21) has a substantially cylindrical hole which is passed through with clearance (12) by the pivot (5), since the diameter of the hole is greater than that of said pivot (5). Thanks to this, the inclination of the arm (2) can vary at will with respect to the central axis of the cavity of the external casing (11).

Lastly, the clamping collar (13) is passed through with clearance by the arm (2) and is slidably mounted in said cavity of the external casing (11) in order to act with pressure on the internal casing (21) and to clamp said arm (2) in a desired variable angular position with respect to the central axis of the cavity of said external casing (11).

Figure 2:
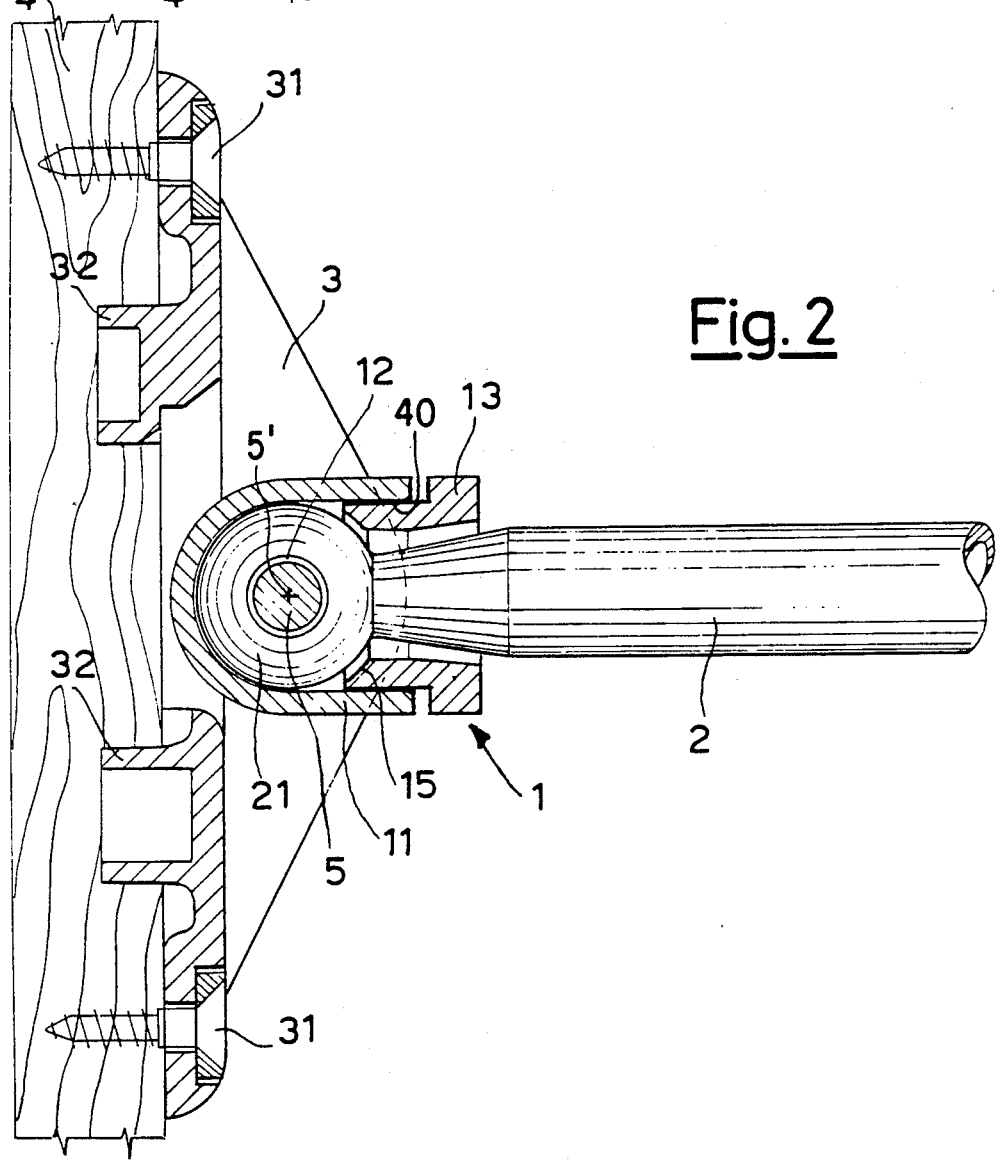
FIG. 2 is a transverse cross-section of the device according to the present invention.

In FIGS. 1 and 2, the above clamping collar (13) is represented in a raised position with respect to the internal casing (21) before the arm (2) has been placed in the desired position with respect to the central axis of the external casing (11). After the operator has caused the arm (2) to assume the desired position, he will clamp the arm (2) in said position by fastener means such as rotating screws (14) which cause the descent of collar (13) until the annular surface (15) of said collar (13) shall be in tight contact with the internal casing (21) clamping it.

The desired variable angular position is a selected one angular position of a range of angular positions of inclination. Preferably, the maximum angle (60) of inclination of arm (2) with respect to the central axis of the cavity of internal casing (11) is of about 10°, even more preferably the maximum inclination is of 7°. This is obtained by a suitable selection of the clearance (12) between mounting pivot (5) and the hole of internal casing (21) through which it passes and/or the clearance between arm (2) and clamping collar (13).

The range is thus facilitated by the clearance between the portion of the clamping collar (13) which is opposite the annular surface (15) thereof and the tapered extremity of the arm (2).

The device (1) is connected to the fastening plates (3) in the following manner. A pair of fastening plates (3) are mounted to the door (4) in spaced apart relation as shown in FIG. 1. The fastening plates (3) are mounted so that central holes (50) provided therein are aligned (and colinear with axis 5'). About its central hole (50), each fastening plate (3) has an annular recessed throat portion (52) sized to receive a disk-shaped fastener cap (54). The fastener cap (54) has a beveled central hole formed therein which tapers to receive a head (56) of a pivot fastener means (58).

In assembly, the pivot member (5) extends through the aligned holes (50) in the pair of fastening plates (3). The pivot member (5) is retained between the pair of fastening plates (3) by pair of fastener caps (54) and the pair of pivot fastener means (58). In this respect, each pivot fastener means (58) comprises a shank portion (59) of smaller diameter than the pivot member. The shank portion (59) extends into the axial center of the pivot member (5). The head (56) of each pivot fastener means (58) is inserted into the central hole of its associated fastener cap, with the shank portion (59) extending into the axial center of the pivot member (5). Since the heads (56) of the pivot fastener means (58) have a larger diameter than the pivot member (5), the pivot member (5) is retained between the fastener plates (3) in the manner shown in FIG. 1.

I claim:

1. A device for the rotatable and adjustable connection of an arm to a fastening plate, particularly for the movement of a door of a cabinet, the device comprising:
   an external connector member having a substantially cylindrical cavity extending therethrough along a cylindrical axis, the external connector member also having a hemispherical cavity formed at least partially internally therein, the hemispherical cavity communicating with the cylindrical cavity and being accessible from the exterior of the external connector member through an access port;
   a substantially spherically-shaped internal connector member fastened to an extremity of the arm, the internal connector member being insertable into the hemispherical cavity of the external connector member through the access port, the internal connector member having a substantially cylindrical hole extending therethrough;
   a pivot member extending through the substantially cylindrical cavity in the external connector member and through the substantially cylindrical hole in the internal connector member, a first clearance being provided between the pivot member and the substantially cylindrical hole to faciliate movement of the internal connector member when obtaining a selected position of the arm;
   a clamping collar through which the arm extends, the clamping collar being mounted in the access port of the external connector member, the clamping collar having an annular surface for contacting the spherically-shaped internal connector member;
   means for causing the annular surface of the clamping collar to apply pressure on the spherically-shaped internal connector member and thereby clamp the arm in a selected position of a range of angular inclination positions.

2. The device of claim 1, wherein a range of angular inclination positions exists with respect to the axis of the substantially cylindrical cavity of the external connector member.

3. The device of claim 2, wherein the maximum inclination angle of the range of angular inclination positions of the arm with respect to the axis of the substantially cylindrical cavity of the external connector member is preferably 10 degrees.

4. The device of claim 2, wherein the maximum inclination angle of the range of angular inclination positions of the arm with respect to the axis of the substantially cylindrical cavity of the external connector member is preferably 7 degrees.

5. The device of claim 1, wherein said access port axis is essentially orthogonal to the cylindrical axis of the cylindrical cavity extending through the external connector member.

6. The device of claim 1, wherein a clearance is provided between the arm and the clamping collar, thereby permitting the arm to be moved through a range of angular inclination positions prior to being clamped in a selected position.

7. The device of claim 6, wherein the arm is tapered at its extremity whereat it is fastened to the internal connector member for providing clearance between the arm and the clamping collar, thereby permitting the arm to be moved through a range of angular inclination positions prior to being clamped in a selected position.

8. The device of claim 1, wherein the means for causing the annular surface of the clamping collar to apply pressure on the spherically-shaped internal connector member comprises fastener means which affix the clamping collar to the external connector member.

9. The device of claim 1, wherein the pivot member extends through aligned holes in a pair of fastening plates, the fastening plates being attached to the door, and wherein the pivot member is retained between the pair of fastening plates by a pair of pivot fastener means and a pair of fastener caps, each pivot fastener means comprising a shank portion of smaller diameter than the pivot member and extendable through a hole in in its respective fastener cap and into the pivot member, the fastener caps having a larger diameter than the pivot member for bearing against its associated fastening plate for retaining the pivot member between the pair of fastening plates.

10. The device of claim 9, wherein said fastener plates have recesses provided therein around their aligned holes to accommodate the fastener caps.

* * * * *